United States Patent
Mayle et al.

(10) Patent No.: US 10,852,170 B2
(45) Date of Patent: Dec. 1, 2020

(54) METHOD AND MEASURING DEVICE FOR DETERMINING A FLUID QUANTITY

(71) Applicant: DIEHL METERING GMBH, Ansbach (DE)

(72) Inventors: Michael Mayle, Ansbach (DE); Peter Ploss, Bayreuth (DE)

(73) Assignee: Diehl Metering GmbH, Ansbach (DE)

( * ) Notice: Subject to any disclaimer, the term of this patent is extended or adjusted under 35 U.S.C. 154(b) by 174 days.

(21) Appl. No.: 16/021,372

(22) Filed: Jun. 28, 2018

(65) Prior Publication Data
US 2019/0003865 A1    Jan. 3, 2019

(30) Foreign Application Priority Data

Jun. 29, 2017  (DE) .................. 10 2017 006 505
Sep. 19, 2017  (DE) .................. 10 2017 008 776

(51) Int. Cl.
*G01F 1/66*  (2006.01)
*G01N 29/22*  (2006.01)
(Continued)

(52) U.S. Cl.
CPC .......... *G01F 1/667* (2013.01); *G01N 29/032* (2013.01); *G01N 29/222* (2013.01);
(Continued)

(58) Field of Classification Search
CPC ....... G01F 1/662; G01F 1/667; G01N 22/032; G01N 2291/02836
See application file for complete search history.

(56) References Cited

U.S. PATENT DOCUMENTS

| 3,401,360 A | 9/1968 | Schulz-Du Bois |
| 4,838,127 A | 6/1989 | Herremans et al. |

(Continued)

FOREIGN PATENT DOCUMENTS

| DE | 102012019217 A1 | 4/2014 |
| GB | 2343249 A | 5/2000 |
| WO | 2010034713 A2 | 4/2010 |

OTHER PUBLICATIONS

Jian Li, et al., "Implementing Guided Wave Mode Control by Use of a Phased Transducer Array". IEEE Transactions on Ultrasonics, Ferroelectrics, and Frequency Control, vol. 48, No. 3, May 2001.

(Continued)

*Primary Examiner* — Nathaniel J Kolb
(74) *Attorney, Agent, or Firm* — Laurence A. Greenberg; Werner H. Stemer; Ralph E. Locher

(57) ABSTRACT

A method determines a fluid quantity relating to a fluid flowing in a measuring device. The measuring device has a measuring tube which receives the fluid, and first and second oscillation transducers. An excitation of a total wave, which is conducted through a wall of the measuring tube, by the first and/or second oscillation transducer, by wave components which are conducted in the wall being excited by the oscillation transducers in a plurality of excitation regions. These wave components are superposed to form the total wave. A distance between the centers of the excitation regions and the excitation frequency are selected such that an oscillation mode to be attenuated is quenched by destructive interference of the wave components in a propagation direction. Excitation of a compression oscillation of the fluid by the total wave occurs. Measurement data relating to the compression oscillation is used to determine the fluid quantity.

15 Claims, 2 Drawing Sheets

(51) Int. Cl.
*G01N 29/032* (2006.01)
*G01H 1/12* (2006.01)
*B06B 1/06* (2006.01)

(52) U.S. Cl.
CPC .......... *B06B 1/0622* (2013.01); *B06B 1/0692* (2013.01); *G01H 1/12* (2013.01); *G01N 2291/02836* (2013.01)

(56) References Cited

U.S. PATENT DOCUMENTS

| | | | |
|---|---|---|---|
| 5,228,347 A * | 7/1993 | Lowell | G01F 1/667 |
| | | | 73/861.27 |
| 6,575,043 B1 | 6/2003 | Huang et al. | |
| 8,181,535 B2 * | 5/2012 | Huang | G01F 1/662 |
| | | | 73/861.25 |
| 9,664,543 B2 | 5/2017 | Twerdowski et al. | |
| 2006/0020404 A1 | 1/2006 | Kishiro et al. | |
| 2010/0000331 A1 | 1/2010 | Gysling | |
| 2010/0192703 A1 * | 8/2010 | Huang | G01F 1/7082 |
| | | | 73/861.28 |
| 2011/0239769 A1 | 10/2011 | Schmitt et al. | |
| 2016/0313157 A1 * | 10/2016 | Nikolovski | G01K 11/24 |

OTHER PUBLICATIONS

Lindner Gerhard, "Sensors and actuators based on surface acoustic waves propagating along solid-liquid interfaces". Institute of Sensor and Actuator Technology, Coburg University of Applied Sciences, Am Hofbraeuhaus 1, 96450 Coburg, Germany; Received Feb. 1, 2008, in final form Apr. 2, 2008: Published May 30, 2008.

* cited by examiner

METHOD AND MEASURING DEVICE FOR DETERMINING A FLUID QUANTITY

CROSS-REFERENCE TO RELATED APPLICATION

This application claims the priority, under 35 U.S.C. § 119, of German application DE 10 2017 006 505.5, filed Jun. 29, 2017 and of German application DE 10 2017 008 776.8, filed Sep. 19, 2017; the prior application is herewith incorporated by reference in its entirety.

BACKGROUND OF THE INVENTION

Field of the Invention

The invention relates to a method for determining a fluid quantity relating to a fluid and/or a fluid flow of the fluid with a measuring device, which contains a measuring tube which receives the fluid and/or through which the fluid flows, and a first and a second oscillation transducer which are arranged at a distance from one another on the measuring tube. The invention also relates to a measuring device.

One possibility for measuring a flow through a measuring tube involves ultrasonic meters. In these, at least one ultrasound transducer is used in order to introduce an ultrasound wave into the fluid flowing through the measuring tube, this wave being conducted on a straight path or after multiple reflections at walls or special reflection elements to a second ultrasound transducer. A flow rate through the measuring tube can be determined from the time of flight of the ultrasound wave between the ultrasound transducers, or from a time-of-flight difference in the event of interchanging of the transmitter and receiver.

It is known from the article by G. Lindner, "Sensors and actuators based on surface acoustic waves propagating along solid-liquid interfaces", J. Phys. D: Appl. Phys. 41 (2008) 123002, in order to excite conducted waves, to use so-called interdigital transducers in which a piezoelectric element is used that has control lines engaging in one another in the manner of a comb, in order to achieve excitation of particular excitation modes of conducted waves. Since shear modes of the piezoelectric element are necessarily excited, a high efficiency of the excitation is not typically achieved. Furthermore, relatively elaborate high-accuracy lithography is required in order to apply the required electrode structure with sufficient exactness, a sufficient mode purity of the excitation nevertheless often not being achieved.

However, excitation of a pure-mode conducted wave is highly relevant for use in an ultrasonic meter, since the angle at which compression oscillations are emitted into the fluid depends on the phase velocity of the conducted wave, which is typically different in different excitation modes for the same excited frequency. If various modes are excited, this results in various propagation paths for the compression oscillations in the fluid, which can at best be compensated for by elaborate signal evaluation.

BRIEF SUMMARY OF THE INVENTION

It is therefore the object of the invention to provide a measurement method which uses conducted waves for the measurement, the intention being to achieve a low installation space requirement and a simple structure of a measuring device used, and preferably to achieve maximally pure-mode excitation of conducted waves.

The object is achieved according to the invention by a method of the type mentioned in the introduction, which contains the following steps:
a) excitation of a respective total wave, which is conducted through a wall of the measuring tube, by the first and/or second oscillation transducer, by wave components which are respectively conducted in the wall being excited by the respective oscillation transducers in a plurality of mutually separated excitation regions, these wave components being superposed to form the respective total wave, the distance between the centers of the excitation regions and the excitation frequency being selected in such a way that an oscillation mode to be attenuated is at least partially quenched by destructive interference of the wave components at least in one propagation direction;
b) excitation of a compression oscillation of the fluid by the respective total wave;
c) recording of measurement data relating to the compression oscillation by means of the respective other oscillation transducer; and
d) determination of the fluid quantity as a function of the measurement data.

According to the invention, it is proposed to excite a wall of a measuring tube in a plurality of mutually separated excitation regions. By superposition of the wave components generated, the total wave that is subsequently used for the excitation of the compression oscillations in the fluid is generated. In this case, the excitation regions and the excitation frequency are matched to one another in such a way that an oscillation mode to be attenuated is attenuated by destructive interference at least for one propagation direction. In this way, an improvement in the mode purity of the excitation can be achieved by deliberately attenuating an undesired oscillation mode. In addition or as an alternative, as will be explained in more detail below, direction-dependent attenuation of the oscillation mode may be carried out, so that, for example when exciting an essentially plane wave, emission of the plane wave may be carried out exclusively in one direction or essentially in one direction.

In the case of a measuring tube which has a plurality of walls, the oscillation transducers may be arranged on the same wall or on different walls of the measuring tube. The excitation of the total wave is in this case, in particular, carried out in that wall on which the respective oscillation transducer is arranged. The total wave and/or the wave components are in particular Lamb waves. Excitation of Lamb waves takes place when the wall thickness is comparable to the wavelength of the transverse wave in the solid. Lamb waves are combined pressure and shear waves, so that a deflection of the inner face of the wall in the direction of the fluid, or away from the fluid, also results in the case of excitation on the outer side of the wall of the measuring tube. By these deflections, compression waves are in turn initiated in the fluid. The entire region within which the conducted wave propagates on the wall may therefore be used as an excitation surface for a compression oscillation of the fluid.

Conversely, the compression oscillation of the fluid in an extended region of the wall may in turn excite a conducted wave which can be recorded by the respective receiving oscillation transducer. In this case, wavelength selectivity of the measurement may be achieved by the selected spacing of the excitation regions and optionally by selection of the sign or the phase during the superposition of the measuring signals recorded in the various excitation regions.

The introduction of the wave components in the various excitation regions may be carried out with the aid of an oscillation element used for a plurality of excitation regions, this element being coupled directly or indirectly to the measuring tube only in the respective excitation regions. Preferably, however, separate oscillation elements are used for the individual regions. The oscillation element or elements may be coupled directly to the wall of the measuring tube, for example adhesively bonded to the measuring tube, or a coupling element may be arranged between the oscillation element and the wall.

The oscillation element or the oscillation elements may be coupled to the measuring tube or a further coupling element by a viscous layer. This layer may have a viscosity of less than $10^8$ mPas (millipascal-seconds), in particular a viscosity of between 0.6 mPas and $10^6$ mPas. For example, a silicone oil, the properties of which may be further adapted by additives, for example introduced particles, may be used as a viscous coupling layer. The layer thickness of the coupling layer may be between 10 μm and 100 μm.

Compared with rigid coupling, for example adhesive bonding, the advantage is achieved that stresses between the oscillation element and the wall in the event of a temperature change can be avoided. The measuring tube may for example be formed from metal or plastic, and the oscillation element may for example be a piezoceramic with applied electrodes. Since these materials have different thermal expansion coefficients, it is advantageous to compensate for resulting different expansions by a viscous layer.

The viscous layer may be electrically insulating, for example in order to insulate an electrode of the oscillation element from a conductive measuring tube. As an alternative, it is possible for the viscous layer to be electrically conductive, for example in order to allow contacting of the electrode through the conductive layer. The viscous layer may contain particles, in particular metal particles. This may on the one hand be used to achieve a conductivity of the viscous layer, and on the other hand the viscosity of the layer may be adapted according to requirements by addition of particles.

As an alternative to coupling by means of a viscous layer, it would also be possible to couple the oscillation element or the oscillation elements directly to the wall, in order to allow more efficient introduction of oscillations into the wall. This is possible, for example, when excessively large temperature variations are not expected during operation of the measuring device.

The excitation regions may be essentially rectangular, for example in order to excite essentially plane wave components. They may, however, also be curved, in order for example to emit a focused wave component or spread the wave component into an aperture angle.

As already mentioned, almost complete quenching of the oscillation mode to be attenuated may be achieved in the method according to the invention when plane wave components are excited in the excitation regions. Various approaches, which will be explained below, are possible for this.

The half-wavelength, or an odd multiple of the half-wavelength, of the oscillation mode to be attenuated with the selected excitation frequency may be selected as the distance between the centers of two excitation regions, the excitation being carried out with the same phase angle in both excitation regions, and in particular with the same excitation profile. This results in destructive interference at least for propagation directions of the oscillation mode to be attenuated that lie parallel to the straight line connecting the centers. If essentially plane wave components are excited, in particular by using rectangular excitation regions, the oscillation mode to be attenuated may be quenched essentially fully for these. For a given excitation frequency, the wavelengths of the oscillation modes excited are dictated by the dispersion relation of the wall of the measuring tube, or of that wall section which conducts the wave. The procedure described may also be used for excitation in more than two excitation regions. Preferably, in this case, for a plurality of pairs of excitation regions it is the case that the spacing of their centers corresponds to the half-wavelength or to an odd multiple of the half-wavelength of the oscillation mode to be attenuated.

The excitation profile may describe the profile as a function of time of the deformation of the wall caused by the excitation, or of the forces exerted. When identical oscillation elements are used for the excitation in different excitation regions, in particular the same excitation signal may be used for a plurality of oscillation elements, in order to achieve an identical excitation profile.

As an alternative, it is possible for the wavelength or a multiple of the wavelength of the oscillation mode to be attenuated with the selected excitation frequency to be selected as the distance between the centers of two excitation regions, the excitation being carried out with a phase offset of 180° between the excitation regions or with a mutually opposite excitation profile. This also results in destructive interference for the oscillation mode to be attenuated.

An opposite excitation profile may, for example, be achieved by each of the excitation regions being assigned a respective oscillation element, an excitation signal being delivered to one of the oscillation elements and the inverted excitation signal being delivered to the further oscillation element, or by a connection polarity of the oscillation elements or an orientation of the oscillation elements with respect to the wall being reversed for the different excitation regions.

Excitations of this type may also be employed when using a plurality of excitation regions, the excitation regions preferably lying linearly behind one another and an opposite excitation profile, or a phase offset of 180°, preferably being used in each case for successive excitation regions.

The excitation frequency may be selected in such a way that an excited further oscillation mode of the total wave has twice or half the wavelength of the oscillation mode to be attenuated. The further oscillation mode may be amplified by the superposition of the wave components. If the half-wavelength of the oscillation mode to be attenuated, or an odd multiple thereof, is selected as the distance between the centers of the excitation regions and the excitation is carried out in-phase, or with the same excitation profile, then a further oscillation mode with half the wavelength is amplified. If, however, the wavelength of the oscillation mode to be attenuated or an odd multiple thereof is selected as the distance between the centers of the excitation regions and the excitation is carried out with a phase offset of 180°, or with mutually opposite excitation profiles, then a further oscillation mode with twice the wavelength is amplified. An excitation frequency, with which an oscillation mode to be attenuated and an oscillation mode having twice or half the wavelength can be excited with the same excitation frequency, may be determined from the dispersion relation of the wall in which, or of the wall section of the measuring tube in which, the wave components are excited.

The excitation frequency may be selected in such a way that only the oscillation mode to be attenuated and the further or a further oscillation mode is excited. A corresponding frequency may be determined with the aid of the dispersion relation of the wall, or of the wall section.

Particularly in the case of relatively low excitation frequencies and/or wall thicknesses, for example for Lamb waves, only two branches of the dispersion relation occur, in particular the so-called $A_0$ and $S_0$ branches, which correspond to the fundamental modes of the asymmetric and symmetric Lamb waves.

In order to determine the fluid quantity or a further fluid quantity, further measurement data may be recorded, the excitation in two of the excitation regions in order to record the measurement data being carried out with the same phase and the same excitation profile, and in order to record the further measurement data with a phase offset of 180° or opposite excitation profile, or vice versa. It is also possible that, when using more than two excitation regions, a corresponding phase offset or a corresponding reversal of the excitation profile is carried out for parts of the excitation regions. An opposite excitation profile may, for example, be achieved by reversing the interconnection of electrodes of an oscillation element used for an excitation region, or inverting a drive signal.

The effect which can be achieved by the procedure described is that, in order to record the measurement data, a first oscillation mode is attenuated and a second oscillation mode is amplified, and in order to record the further measurement data the first oscillation mode is amplified and the second oscillation mode is attenuated. This allows mode-selective excitation for two different oscillation modes. Since, as explained in the introduction, different propagation paths for the excited compression oscillations in the fluid result for different oscillation modes of Lamb waves, a measurement of the fluid quantity in relation to different propagation paths may therefore be achieved with little technical outlay.

In addition or as an alternative, the explained matching of the distance between the centers of the excitation regions and the excitation frequency may be used to influence a propagation direction of the total wave, or to attenuate the propagation of the total wave in one direction. To this end, particularly when exciting essentially plane waves, the spacing of the centers and the phase angle of the excitations may be selected in such a way that an oscillation mode of the wave components is essentially quenched in one direction and amplified in the other direction.

One quarter of the wavelength or an odd multiple of one quarter of the wavelength of the oscillation mode to be attenuated with the selected excitation frequency may be selected as the distance between two excitation regions, the excitation being carried out with a phase offset of 90° between the excitation regions. When exciting a plane wave, two plane waves which travel in opposite propagation directions are conventionally excited. The above-described superposition results in a constructive interference for one of these propagation directions and destructive interference for the other.

This will be shown below with reference to an example in which the spacing is one quarter of the wavelength of the oscillation mode to be attenuated and a phase offset of +90° is used. In a first excitation region, the following conducted wave is excited:

$$y_1 = \sin\left(\frac{2\pi}{\lambda}x - \omega t\right) + \sin\left(-\frac{2\pi}{\lambda}x - \omega t\right).$$

Here, $\lambda$ is the wavelength, x is the distance from the excitation position, t is the time and $\omega$ is the product of $2\pi$ and the frequency of the conducted wave. Because of the phase offset and the distance between the regions, the following conducted wave travelling in both directions is excited in the second region:

$$y_2 = \sin\left(\frac{2\pi}{\lambda}\left(x + \frac{\lambda}{4}\right) - \omega t - \frac{\pi}{2}\right) + \sin\left(-\frac{2\pi}{\lambda}\left(x + \frac{\lambda}{4}\right) - \omega t - \frac{\pi}{2}\right).$$

A superposition, i.e. a sum of the two waves, may be calculated by trigonometric rearrangement, the following result being obtained:

$$y_1 + y_2 = 2 \cdot \sin\left(\frac{2\pi}{\lambda}x - \omega t\right).$$

A superposition of the two conducted waves therefore results in a conducted wave which propagates only in one propagation direction, since constructive interference results for this propagation direction and destructive interference results for the opposite propagation direction.

As may readily be seen from the calculation above, the addition of a complete wavelength to the oscillation mode to be attenuated does not change the result. Addition of one half-wavelength, i.e. distances of for example 0.75 times, 1.75 times or 2.75 times the distance, or a phase shift of −90°, would lead to reversal of the remaining propagation direction. By selection of a phase offset between the excitation regions, for example by separate provision of excitation signals for the oscillation elements which are assigned to the individual excitation regions, the procedure described therefore also allows elective specification of one of two possible propagation directions for the total wave.

The approaches discussed above for suppressing an oscillation mode and for suppressing a propagation direction may be combined. To this end, the excitation frequency may be selected in such a way that the oscillation mode to be attenuated is at least partially quenched by destructive interference of the wave components in the propagation direction, and a further oscillation mode to be attenuated in a further propagation direction opposite to the propagation direction is at least partially quenched by destructive interference of the wave components in the further propagation direction. In particular, the wave components may be superposed in such a way that the oscillation mode to be attenuated is amplified in the further propagation direction by constructive interference, and the further oscillation mode to be attenuated is amplified in the propagation direction. In particular, the oscillation mode to be attenuated may be emitted essentially only in the further propagation direction and the further oscillation mode to be attenuated may be emitted essentially only in the propagation direction. Different oscillation modes are therefore emitted in different propagation directions.

This may be achieved by the excitation frequency being selected in such a way that the ratio of the wavelength $\lambda_0$ of the oscillation mode to be attenuated to the wavelength $\lambda_1$ of the further oscillation mode to be attenuated is $$\frac{\lambda_0}{\lambda_1} = \frac{2(2p+1)+(-1)^m}{2m+1},$$

where m and p are respectively zero or a positive integer. As explained below, m specifies the distance between the centers of the excitation regions and the sign of the phase difference. This relation may be derived as now described.

If an oscillation mode with the wavelength $\lambda_0$ is intended to be emitted directionally, then, as explained above, the distance $\Delta x$ may be one quarter of the wavelength or an odd multiple of one quarter of the wavelength of the oscillation mode to be attenuated:

$$\Delta x = (2m+1) \cdot \frac{\lambda_0}{4},$$

where m is zero or an integer. The phase offset $\varphi$ may then be selected as follows:

$$\phi = (-1)^m \frac{\pi}{2}.$$

If the further oscillation mode to be attenuated is intended to be quenched in that direction in which the oscillation mode to be attenuated is amplified, then the further oscillation mode to be attenuated must interfere destructively, i.e. have a phase offset of 180°, or $\pi$, or an integer odd multiple thereof:

$$(2p+1) \cdot \pi = 2\pi \frac{\Delta x}{\lambda_1} - \phi,$$

where p is equal to zero or an integer. Substitution of $\Delta x$ and $\varphi$ and rearrangement results in the condition above for the ratio of the wavelengths. If the dispersion relation of the wall is known, then an excitation frequency for which this condition is satisfied may deliberately be selected. Preferably, the excitation frequency is in this case selected in such a way that exactly 2 oscillation modes of Lamb waves can be excited, the wavelengths of which have the ratio described. Preferably, p and/or m are each less than or equal to five or less than or equal to three.

The first and/or the second oscillation transducer may respectively contain a plurality of oscillation elements, by which one of the wave components is respectively excited. A common control signal may be provided by a control device for the oscillation elements, if in-phase excitation or an identical excitation profile is desired. A phase shift of 180°, or reversal of the excitation profile, may for example by achieved by inverting a drive signal, arranging a corresponding oscillation element in a reversed fashion on the wall, or changing a polarity of the connection of the oscillation element to a control device.

The oscillation elements may be piezoelectric oscillation elements. They may be arranged on the wall or on a coupling element arranged between the wall and the oscillation element. Relatively simple electrode structures are preferably used. For example, only two opposite electrodes may be provided, in which case one of these electrodes may also locally be routed around the oscillation element for easier contacting and/or protrude from the oscillation element as a plate electrode. Preferably, a thickness oscillation of the oscillation element is excited perpendicularly to the wall of the measuring tube.

The dimensions of the respective oscillation element may be selected in such a way that the selected excitation frequency is a resonant frequency of the oscillation element, in particular a resonant frequency of a thickness oscillation. The oscillation elements may extend essentially over the width of the measuring tube. It is, however, also possible to provide a plurality of, in particular jointly controlled, oscillation elements in an excitation region. For example, a linear straight or curved arrangement of, for example, circular oscillation elements may be used in order essentially to excite a plane wave in the respective excitation region. The extent of the oscillation elements in the longitudinal direction of the tube, or in the direction of a straight connecting line between the centers of the excitation regions, may for example be equal to or less than half the wavelength of the oscillation mode to be attenuated.

It is also possible to use very thin oscillation elements. In this case, it is possible that the oscillation elements do not have a natural mode in the region of the excitation frequency, so that broadband excitation is made possible. It is also possible to use so-called "piezoelectric wafer active sensors" as oscillation elements.

By the method according to the invention, measurements can be carried out on a fluid flow flowing through the measuring tube, but also on a fluid which is static in the measuring tube. The use of oscillation transport for recording fluid properties is in principle known in the prior art. In ultrasonic meters, for example, it is often the case that time-of-flight differences of a time of flight of an oscillation between a first and a second ultrasound transducer and vice versa are often recorded and a fluid velocity can be determined therefrom. It is, however, also possible to evaluate other measurement data in order to determine fluid properties. For example, a signal amplitude at the receiving oscillation transducer may be evaluated in order to record an attenuation of the oscillation during the transport through the fluid. Amplitudes may also be evaluated frequency-dependently, and absolute or relative amplitudes of particular spectral ranges may be evaluated in order to record a spectrally different attenuation behavior in the fluid. Phase angles of different frequency bands may also be evaluated, in order for example to obtain information about the dispersion behavior of the measurement section. Preferably, information about the dispersion behavior of the pressure wave in the fluid and/or about the behavior of the Lamb wave in the wall may be determined. As an alternative or in addition, changes in the spectral composition or the amplitude as a function of time, for example within a measurement pulse, may also be evaluated.

By evaluation of these quantities, a flow rate and/or a flow volume and/or a density, temperature and/or viscosity of the fluid may for example be determined as fluid quantities. In addition or as an alternative, for example, a speed of sound in the fluid and/or a composition of the fluid, for example a mixing ratio of different components, may be determined. Various approaches for obtaining these fluid quantities from the measurement quantities explained above are known in the prior art, and will therefore not be presented in detail. For example, relationships between one or more measurement quantities and the fluid quantity may be determined empirically, and for example a look-up table or a corresponding formula may be used in order to determine the fluid quantity.

Besides the method according to the invention, the invention also relates to a measuring device for determining a fluid quantity relating to a fluid and/or a fluid flow of the fluid. The measuring device contains a control device, a measuring tube which receives the fluid and/or through which the fluid flows, and a first and a second oscillation transducer which are arranged at a distance from one another on the measuring tube. The control device is configured to drive the first and/or second oscillation transducer in order to excite a respective total wave, which is conducted through a wall of the measuring tube, by wave components which are respectively conducted in the wall being excited by the respective oscillation transducers in a plurality of mutually separated excitation regions, these wave components being superposed to form the respective total wave. The distance between the centers of the excitation regions and the excitation frequency are selected in such a way that an oscillation mode, to be attenuated, of the wave components is at least partially quenched by destructive interference of the wave components at least in one propagation direction. Wherein compression oscillations of the fluid can be excited by the respective total wave and these compression oscillations can be conducted through the fluid to the respective other oscillation transducer and recorded there by the control device in order to determine measurement data. The fluid quantity can be determined by the control device as a function of the measurement data.

The measuring device is, in particular, configured for carrying out the method according to the invention, and may be refined with the features disclosed regarding the method according to the invention. The method according to the invention may likewise be refined with features which are explained regarding the measuring device. The excitation frequency may be specified in a fixed fashion, for example by corresponding programming or a corresponding structure of the control device.

The first and/or the second oscillation transducer respectively may contain a plurality of oscillation elements, at least one respective oscillation element in each of the excitation regions being coupled to the measuring tube directly or by at least one coupling element. For example, a viscous layer and/or an element which carries the oscillation element may be used as a coupling element. The oscillation element may for example be a piezoelectric oscillation element, an electromagnetic oscillation element, a capacitive micromechanical ultrasound transducer or an electroactive polymer.

The control device may provide a common drive signal for the oscillation elements of the respective oscillation transducer, the drive signal being delivered directly to at least one oscillation element and with reversed polarity to at least one oscillation element, so that a mutually opposite excitation profile of the oscillation elements results, or the drive signal being delivered directly to all oscillation elements. Such common provision of a drive signal is particularly simple to achieve technically. Reversal of the polarity may, for example, be carried out by reversed connection of electrodes of the oscillation elements or by means of an inverter circuit. It is also possible for the measuring device to be configured in such a way that it is possible to switch over between direct delivery of the drive signal and delivery with reversed polarity for some of the oscillation elements, for example in order to switch over between different oscillation modes to be attenuated or amplified, as explained regarding the method according to the invention.

As an alternative, the control device may be configured to provide, for at least two of the oscillation elements, drive signals which are mutually phase-shifted or have a mutually opposite signal profile. For example, the drive signals may be provided via different channels of one or more digital/analogue converters.

Other features which are considered as characteristic for the invention are set forth in the appended claims.

Although the invention is illustrated and described herein as embodied in a method and a measuring device for determining a fluid quantity, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

DETAILED DESCRIPTION OF THE INVENTION

Figure 1:
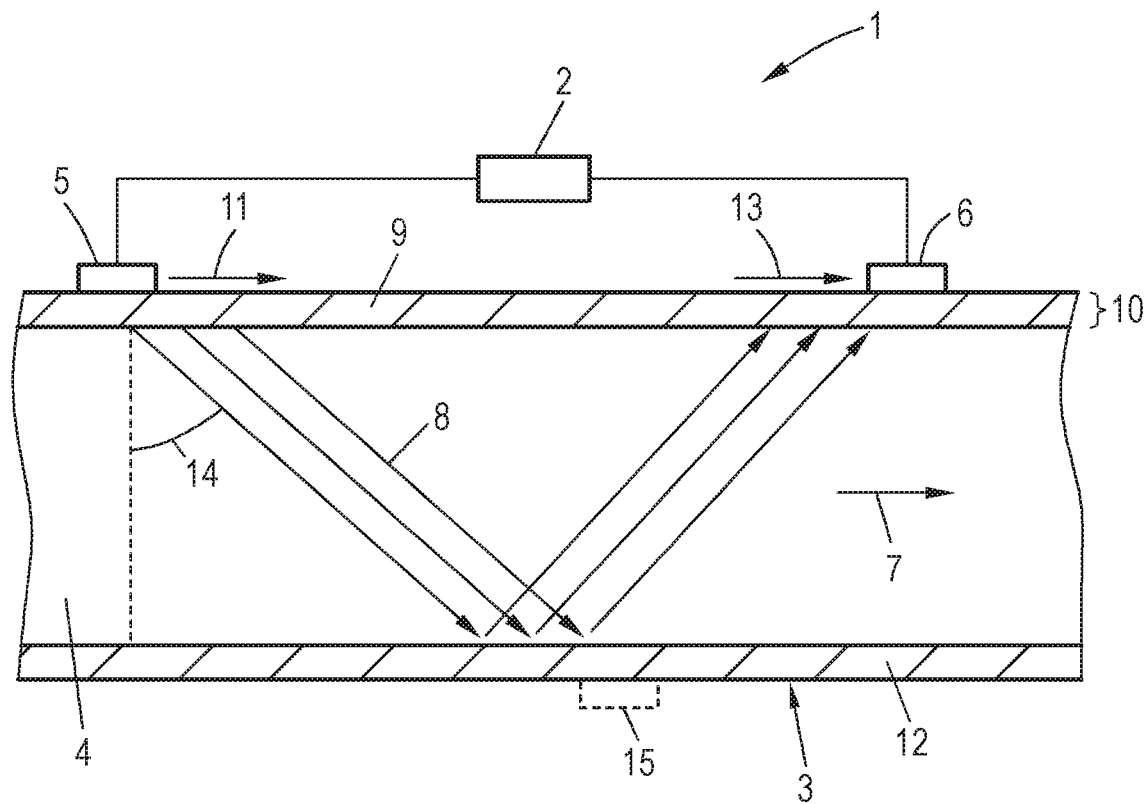
FIG. 1 is a sectional view of one exemplary embodiment of a measuring device according to the invention, by which one exemplary embodiment of the method according to the invention may be carried out.

Referring now to the figures of the drawings in detail and first, particularly to FIG. 1 thereof, there is shown a measuring device 1 for determining a fluid quantity relating to a fluid and/or a fluid flow. The fluid is in this case conducted in a direction shown by the arrow 7 through an interior 4 of a measuring tube 3. In order to determine the fluid quantity, in particular a flow volume, a time-of-flight difference between the times of flight from a first oscillation transducer 5 to a second oscillation transducer 6 and vice versa may be determined by a control device 2. In this case, use is made of the fact that this time of flight depends on a velocity component of the fluid parallel to a propagation direction of an ultrasound ray 8 through the fluid. From this time of flight, it is therefore possible to determine a flow rate averaged over the path of the respective ultrasound ray 8 in the direction of the respective ultrasound ray 8, and therefore approximately an averaged flow rate in the volume through which the ultrasound ray 8 passes.

In order on the one hand to allow arrangement of the oscillation transducers 5, 6 outside the measuring tube 3, and on the other hand to reduce a sensitivity in relation to different flow rates at different positions of the flow profile, an ultrasound ray 8, i.e. a pressure wave, is not induced directly in the fluid by the first oscillation transducer 5. Instead, a conducted wave is excited in a side wall 9 of the measuring tube 3 by the oscillation transducer 5. The excitation is carried out with a frequency which is selected in such a way that a Lamb wave is excited in the side wall 9. Such waves can be excited when a thickness 10 of the side wall 9 is comparable to the wavelength of the transverse wave in the solid, which is given by the ratio of the speed of sound of the transverse wave in the solid and the excited frequency.

The conducted wave excited in the side wall 9 by the oscillation transducer 5 is schematically represented by the arrow 11. By the conducted wave, compression oscillations of the fluid are excited, which are emitted into the fluid in the entire propagation path of the conducted wave. This is represented schematically by the ultrasound rays 8 offset with respect to one another in the flow direction. The emitted ultrasound rays 8 are reflected at an opposite side wall 12 and conducted through the fluid back to the side wall 9. There, the incident ultrasound rays 8 again excite a conducted wave in the side wall 9, which wave is schematically represented by the arrow 13 and can be recorded by the oscillation transducer 6 in order to determine the time of flight. As an alternative or in addition, it is possible to record the emitted ultrasound waves by an ultrasound transducer 15 which is arranged on the side wall 12. In the example shown, the ultrasound rays 8 are not reflected, or are reflected only once, at the side walls 9, 12 on their path to the ultrasound transducer 6, 15. It would, of course, be possible to use a longer measurement section, in which case the ultrasound rays 8 are reflected several times at the side walls 9, 12.

In the procedure described, it may be problematic that the dispersion relation for Lamb waves in the side wall 9 has a plurality of branches. During excitation with a particular frequency specified by the control device 2, it would therefore be possible for different oscillation modes, which have different phase velocities, to be excited for the Lamb wave. The effect of this is that the compression waves are emitted at different Rayleigh angles 14 as a function of these phase velocities. This results in different paths, which typically have different times of flight, for the conduction of the ultrasound wave from the oscillation transducer 5 to the oscillation transducer 6 and vice versa. The received signals for these different propagation paths would therefore need to be separated by elaborate signal processing by the control device 2, in order to be able to determine the fluid quantity. This on the one hand requires an elaborate control device, and on the other hand is not robustly possible in all applications. Maximally pure-mode excitation of conducted waves should therefore be carried out in the oscillation transducer 5.

Figure 2:
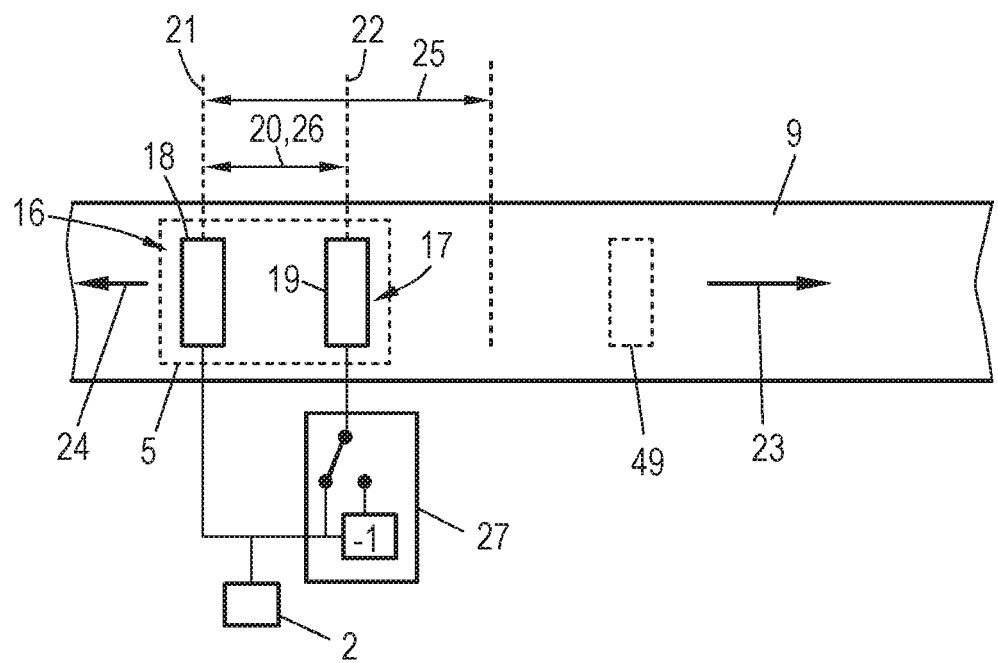
FIG. 2 is a top plan view of a part of the measuring device.

FIG. 2 shows a structure of the oscillation transducer 5, by which pure-mode excitation of a total wave conducted in the wall 9 is made possible. The oscillation transducer 5 contains two mutually separated excitation regions 16, 17, in which wave components respectively conducted in the wall 9 are excited by a respective oscillation element 18, 19, these components being superposed to form the total wave. Lamb waves are excited as wave components. Since the oscillation elements 18, 19 are essentially rectangular and are coupled to the wall in the entire excitation region 16, 17, essentially plane waves, which are conducted through the wall 9 in the propagation directions 23, 24, are excited as wave components.

In order to achieve pure-mode excitation, the distance 20 between the centers 21, 22 of the excitation regions 16, 17 and the excitation frequency specified by the control device 2 are selected in such a way that an oscillation mode, to be attenuated, of the wave components is essentially quenched by destructive interference in the propagation directions 23, 24. In order to achieve this, the excitation frequency is selected in such a way that the wavelength 25 of the oscillation mode to be attenuated, according to the dispersion relation of the wall 9 at the selected excitation frequency, is twice as long as the distance between the centers 21, 22 of the excitation regions 16, 17. Since the oscillation elements 18, 19 are essentially constructed in the same way and are driven with a common drive signal by the control device 2, destructive interference of the wave components results in relation to the oscillation mode to be attenuated, the latter essentially being fully suppressed.

If the excitation frequency is then selected in such a way that only the oscillation mode to be attenuated and a single further oscillation mode are excited, which is readily possible with a known dispersion relation of the wall 9, then essentially pure-mode excitation of the further oscillation mode can be carried out.

In the exemplary embodiment shown, the excitation frequency is selected in such a way that the wavelength 26 of the further excited oscillation mode is exactly half as long as the wavelength 25 of the oscillation mode to be attenuated. In this way, the advantage is achieved that the wave components excited in the excitation regions 16, 17 interfere constructively in relation to the further oscillation mode, so that this oscillation mode is provided having a greater amplitude.

Figure 3:
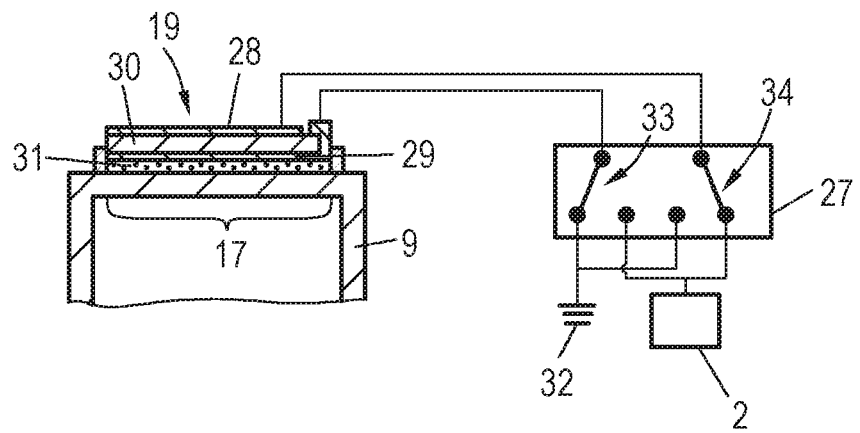
FIG. 3 is a sectional view of an oscillation element connected to a control unit.

The control signal provided by the control device 2 may also be inverted by an inverter circuit 27 before it is delivered to the oscillation element 19. One possibility for this is represented in FIG. 3. The oscillation element 19 consists of a piezoelectric block 30, for example a block 30 of piezoceramic or of a piezocomposite ceramic, on which two flat electrodes 28, 29 are arranged. The oscillation element 19 bears with one electrode 29 on a coupling element 31, namely a viscous coupling layer which couples the oscillation element 19 to the wall 9 in the excitation region 17. The viscous layer may, for example, contain metal particles in order to adapt its viscosity according to requirements. It is preferably nonconductive in order to insulate the electrode 29 from the wall 9, if the wall 9 is conductive. Instead of coupling by the coupling element 31, the oscillation element 19 could also be coupled directly, for example adhesively bonded, to the wall 9. The electrode 29 is primarily arranged on the side of the oscillation element 19 facing towards the measuring tube, but partially covers the block 30 in order to allow easier contacting.

In the state of the inverter circuit 27 as shown, the electrode 29 is coupled to a reference potential 32 and the electrode 28 is supplied with a drive signal of the control device 2. By switching over the switches 33, 34, the allocation of the signals to the electrodes 28, 29 can be reversed, so that a reversed excitation profile in the excitation region 17 results from the same drive signal.

Switching of the inverter circuit 27 therefore leads to excitation with a mutual opposite excitation profile being carried out in the excitation regions 16, 17, i.e. in the case of excitation with a harmonic oscillation excitation takes place with a phase shift of 180°. This leads to the further oscillation mode with the wavelength 26 now being attenuated, while the previously attenuated oscillation mode with the wavelength 25 is amplified. If these two oscillation modes, as explained above, are the only two excitable oscillation modes, mode-selective oscillation excitation can therefore be carried out in the measuring device 1, it being possible to switch over between two oscillation modes. This is advantageous in particular since the Rayleigh angle 14, with which the compression waves are emitted into the fluid, and therefore the propagation path of the compression waves, depends on the phase velocity and therefore on the wavelength of the oscillation mode excited. By the procedure described, it is therefore possible to switch over between two defined propagation paths for the compression waves, so that the determination of the fluid quantity can be improved, or determination of some fluid quantities can be made possible for the first time.

The square cross section of the measuring tube 3 represented in FIG. 3 is purely exemplary. As an alternative, for example, it is also possible to use a measuring tube which is round, or one which is essentially round and flattened only at the arrangement surfaces of the oscillation transducers 5, 6, 15.

FIG. 2 shows in addition a further example of an excitation region 49, which could be used instead of the excitation region 17 or in addition thereto. The center of the excitation region 49 lies 1.5 times the wavelength 25 of the oscillation mode to be attenuated away from the center 21 of the excitation region 16, so that destructive interference for the oscillation mode to be attenuated also results from excitation in the excitation region 49 with the same excitation profile as in the excitation region 16.

Figure 4:
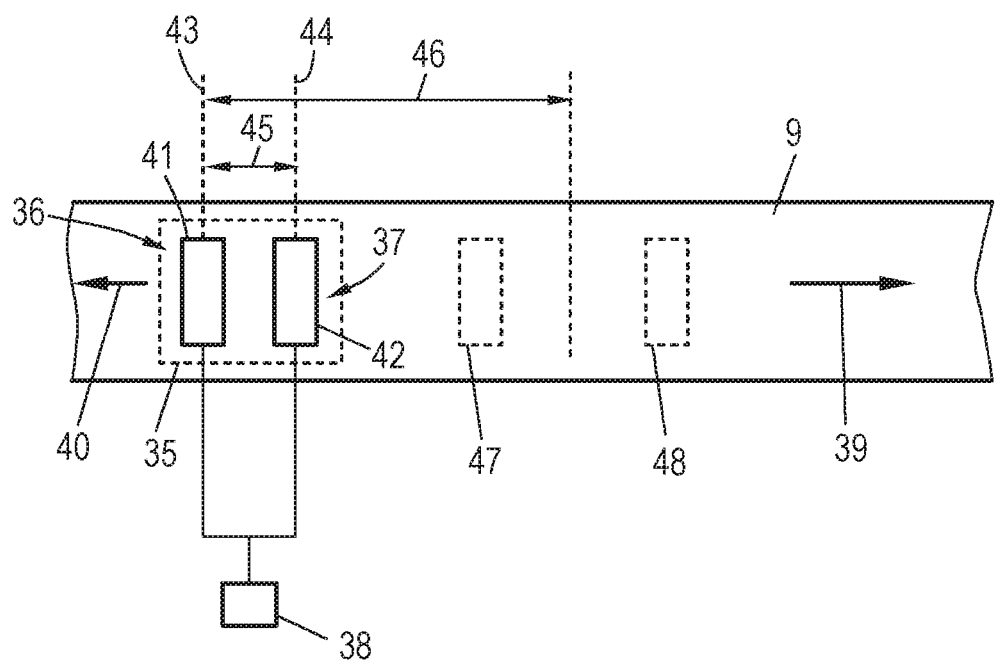
FIG. 4 is a detail view of a further exemplary embodiment of a measuring device according to the invention, by which a further exemplary embodiment of the method according to the invention may be carried out.

In addition or as an alternative to the mode-selective excitation described above, the excitation may also be carried out in such a way that one of a plurality of propagation directions may be specified for the total wave. An example of this is represented in FIG. 4. The structure of the oscillation transducer 35 corresponds substantially to the structure of the oscillation transducer 5 explained above, except for the fact that the distance 45 between the centers 43, 44 of the excitation regions 36, 37 is selected in a different way than as explained above, and that separate drive signals, which are mutually phase-shifted by +90° or −90°, are provided by the control device 38 for the oscillation elements 41, 42 arranged in the excitation regions 36, 37. The distance 45 is in this case selected in such a way that it is one quarter of the wavelength 46 of that oscillation mode which is intended to be suppressed for one of the propagation directions 39, 40. The effect of the selection of this distance, together with the phase shift by 90°, is that the oscillation mode to be attenuated is emitted only in the propagation direction 39 or only in the propagation direction 40, depending on the sign of the phase shift, and emission in the other propagation direction is suppressed by destructive interference.

This effect could also be achieved if, in addition or as an alternative to the excitation in the excitation region 37, excitation is carried out in the excitation region 47, the center of which is separated from the center 43 of the excitation region 36 by three quarters of the wavelength 46, or in the excitation region 48, the center of which is separated from the center 43 of the excitation region 36 by five quarters of the wavelength 46.

If the excitation is carried out in the excitation region 47 instead of in the excitation region 37 with the same phase offset, then the remaining propagation direction of the oscillation mode changes. If, for example, emission of the oscillation mode previously took place only in the propagation direction 39, then with a change of the excitation region from the excitation region 37 to the excitation region 47 it takes place in the propagation direction 40. The propagation direction may again be reversed by changing from a phase shift of +90° to a phase shift of −90°, or vice versa.

The approaches discussed above for suppressing an oscillation mode and for suppressing a propagation direction could be combined. To this end, the excitation frequency may be selected in such a way that a first oscillation mode is emitted essentially only in a first propagation direction, and a second oscillation mode is emitted essentially only in an opposite second propagation direction. Different oscillation modes would therefore be emitted in different propagation directions.

This may be achieved by selecting the excitation frequency in such a way that the ratio of the wavelength $\lambda_0$ of the first oscillation mode to the wavelength $\lambda_1$ of the second oscillation mode $$\frac{\lambda_0}{\lambda_1} = \frac{2(2p+1)+(-1)^m}{2m+1},$$

where m and p are respectively zero or a positive integer. The spacing 45 of the excitation regions is 2m+1 times the quarter of the wavelength. In the example shown in FIG. 4, m is therefore equal to zero. If the excitation regions 47 or 48 shown by dashes were used, then m would be equal to one, or equal to two. P may be selected freely.

The following is a summary list of reference numerals and the corresponding structure used in the above description of the invention:

1 measuring device
2 control device
3 measuring tube
4 interior
5 oscillation transducer
6 oscillation transducer
7 arrow
8 ultrasound ray
9 wall
10 thickness
11 arrow
12 wall
13 arrow
14 Rayleigh angle
15 oscillation transducer
16 excitation region
17 excitation region
18 oscillation element
19 oscillation element
20 distance
21 center
22 center
23 propagation direction
24 propagation direction
25 wavelength
26 wavelength
27 inverter circuit
28 electrode
29 electrode
30 block
31 coupling element
32 reference potential
33 switch
34 switch
35 oscillation transducer
36 excitation region
37 excitation region
38 control device
39 propagation direction
40 propagation direction
41 oscillation element
42 oscillation element
43 center
44 center
45 distance
46 wavelength
47 excitation region
48 excitation region
49 excitation region

The invention claimed is:

1. A method for determining a fluid quantity relating to a fluid or a fluid quantity of a fluid flow of the fluid with a measuring device, the measuring device having a measuring tube for receiving at least one of the fluid or through which the fluid flows, and a first and a second oscillation transducer being disposed at a distance from one another on the measuring tube, which comprises the steps of:
- carrying out an excitation of a respective total wave, being conducted through a wall of the measuring tube, by at least one of the first or the second oscillation transducer, wave components which are respectively conducted in the wall being excited by a plurality of mutually separated excitation regions by at least one of the first or the second oscillation transducer, the wave components being superposed to form the respective total wave;
- selecting a distance between centers of the excitation regions and an excitation frequency such that an oscillation mode to be attenuated is at least partially quenched by destructive interference of the wave components at least in one propagation direction;
- carrying out an excitation of a compression oscillation of the fluid via the respective total wave;
- recording measurement data relating to the compression oscillation by means of the other of the first and the second oscillation transducer; and
- determining the fluid quantity in dependence on the measurement data.

2. The method according to claim 1, which further comprises selecting a half-wavelength or an odd multiple of the half-wavelength of the oscillation mode to be attenuated with the excitation frequency as the distance between the centers of two of the excitation regions, the excitation being carried out with same phase angle in both of the excitation regions.

3. The method according to claim 1, which further comprises selecting a wavelength or a multiple of the wavelength of the oscillation mode to be attenuated with the excitation frequency as the distance between the centers of two of the excitation regions, the excitation being carried out with a phase offset of 180° between the excitation regions.

4. The method according to claim 1, which further comprises selecting the excitation frequency in such a way that an excited further oscillation mode of the respective total wave has twice or half a wavelength of the oscillation mode to be attenuated.

5. The method according to claim 4, which further comprises selecting the excitation frequency so that only the oscillation mode to be attenuated and the further oscillation mode are excited.

6. The method according to claim 5, which further comprises:
- recording further measurement data in order to determine the fluid quantity or a further fluid quantity; and
- carrying out the excitation in of the two excitation regions in order to record the measurement data with a same phase and a same excitation profile, and in order to record the further measurement data with a phase offset of 180°.

7. The method according to claim 1, which further comprises selecting one quarter of a wavelength or an odd multiple of one quarter of the wavelength of the oscillation mode to be attenuated with the excitation frequency as the distance between the centers of the two excitation regions, the excitation being carried out with a phase offset of 90° between the excitation regions.

8. The method according to claim 7, which further comprises selecting the excitation frequency in such a way that the oscillation mode to be attenuated is at least partially quenched by the destructive interference of the wave components in the propagation direction, and a further oscillation mode to be attenuated in a further propagation direction opposite to the propagation direction is at least partially quenched by destructive interference of the wave components in the further propagation direction.

9. The method according to claim 8, which further comprises selecting the excitation frequency in such a way that a ratio of a wavelength $\lambda_0$ of the oscillation mode to be attenuated to a wavelength $\lambda_1$ of a further oscillation mode to be attenuated is $$\frac{\lambda_0}{\lambda_1} = \frac{2(2p+1)+(-1)^m}{2m+1},$$

where m and p are respectively zero or a positive integer.

10. The method according to claim 1, wherein the first and/or the second oscillation transducer respectively contain a plurality of oscillation elements, by which one of the wave components is respectively excited.

11. The method according to claim 10, wherein the oscillation elements are piezoelectric oscillation elements.

12. A measuring device for determining a fluid quantity relating to a fluid or a fluid quantity of a fluid flow of the fluid, the measuring device comprising:
- a control device;
- a measuring tube for receiving at least one of the fluid or through which the fluid flows; and
- a first and a second oscillation transducer being disposed at a distance from one another on said measuring tube and each having a plurality of mutually separated excitation regions, wherein said control device is configured to drive at least one of said first or said second oscillation transducer in order to excite a respective total wave, which is conducted through a wall of said measuring tube, by wave components which are respectively conducted in said wall being excited by said first and said second oscillation transducer by said plurality of mutually separated excitation regions of each of said first or second oscillation transducers, the wave components being superposed to form the respective total wave, wherein a distance between centers of the excitation regions and an excitation frequency is selected in such a way that an oscillation mode to be attenuated is at least partially quenched by destructive interference of the wave components at least in one propagation direction, wherein compression oscillations of the fluid can be excited by the respective total wave and the compression oscillations can be conducted through the fluid to a respective other one of said first and said second oscillation transducer and recorded there by said control device in order to determine measurement data, wherein the fluid quantity can be determined by said control device in dependence on the measurement data.

13. The measuring device according to claim 12, wherein said first and/or said second oscillation transducer respectively contains a plurality of oscillation elements, at least a respective one of said oscillation elements in each of the excitation regions being coupled to said measuring tube directly or by means of at least one coupling element.

14. The measuring device according to claim 13, wherein said control device provides a common drive signal for said oscillation elements of a respective oscillation transducer, the common drive signal being delivered directly to at least one oscillation element and with reversed polarity to at least one other oscillation element, so that a mutually opposite excitation profile of said oscillation elements results.

15. The measuring device according to claim 13, wherein said control device is configured to provide, for at least two of said oscillation elements, drive signals which are mutually phase-shifted.

* * * * *